US 9,249,765 B2

(12) United States Patent
Senda et al.

(10) Patent No.: US 9,249,765 B2
(45) Date of Patent: Feb. 2, 2016

(54) INTAKE MANIFOLD

(71) Applicant: AISIN SEIKI KABUSHIKI KAISHA, Kariya-shi (JP)

(72) Inventors: Tomohisa Senda, Kariya (JP); Hideaki Teramoto, Kariya (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 78 days.

(21) Appl. No.: 13/942,842

(22) Filed: Jul. 16, 2013

(65) Prior Publication Data
US 2014/0034006 A1 Feb. 6, 2014

(30) Foreign Application Priority Data
Jul. 31, 2012 (JP) .................................. 2012-170032

(51) Int. Cl.
*F02M 35/10* (2006.01)
*F02B 47/08* (2006.01)
*F02M 35/104* (2006.01)
*F02M 35/112* (2006.01)

(52) U.S. Cl.
CPC ....... *F02M 35/104* (2013.01); *F02M 35/10281* (2013.01); *F02M 35/10295* (2013.01); *F02M 35/112* (2013.01)

(58) Field of Classification Search
CPC .............. F02M 35/10321; F02M 35/10144; F02M 35/112; F02M 35/10052; F02M 25/0707; F02M 25/074; F02M 25/0701
USPC ........................ 123/184.53, 184.42, 184.21
See application file for complete search history.

(56) References Cited

U.S. PATENT DOCUMENTS

| | | | |
|---|---|---|---|
| 5,427,080 A * | 6/1995 | Maeda et al. | 123/568.17 |
| 5,427,180 A * | 6/1995 | dePaiva Leite et al. | 166/355 |
| 5,572,979 A | 11/1996 | Czadzeck | |
| 7,032,556 B2 * | 4/2006 | Nakamura | 123/184.24 |
| 2004/0200450 A1 * | 10/2004 | Tanikawa et al. | 123/184.42 |
| 2009/0223476 A1 | 9/2009 | Shinkai et al. | |
| 2010/0083929 A1 * | 4/2010 | Sakagami et al. | 123/184.56 |
| 2011/0061970 A1 | 3/2011 | Caliskan | |

FOREIGN PATENT DOCUMENTS

| | | |
|---|---|---|
| EP | 1 903 194 A1 | 3/2008 |
| EP | 2 295 782 A1 | 3/2011 |
| JP | 9-280127 A | 10/1997 |
| JP | 10-281042 A | 10/1998 |
| JP | 2010-65575 A | 3/2010 |

(Continued)

OTHER PUBLICATIONS

Extended European Search Report issued on Nov. 18, 2013, by the European Patent Office in corresponding European Patent Application No. 13176664.4-1606. (5 pages).

*Primary Examiner* — Lindsay Low
*Assistant Examiner* — Syed O Hasan
(74) *Attorney, Agent, or Firm* — Buchanan Ingersoll & Rooney P.C.

(57) ABSTRACT

An intake manifold includes plural intake pipes, a distribution portion connecting to the plural intake pipes and guiding fluid at an inside of the distribution portion to the plural intake pipes and a first protruding portion providing at least a same number of the plural intake pipes at the inside of the distribution portion, the first protruding portion being directed to the corresponding intake pipes.

8 Claims, 7 Drawing Sheets

(56) References Cited

FOREIGN PATENT DOCUMENTS

| | | |
|---|---|---|
| JP | 2010-84640 A | 4/2010 |
| JP | 2011-247274 A | 12/2011 |
| JP | 2012-87732 A | 5/2012 |
| WO | 85/01778 A1 | 4/1985 |

* cited by examiner

INTAKE MANIFOLD

CROSS REFERENCE TO RELATED APPLICATIONS

This application is based on and claims priority under 35 U.S.C. §119 to Japanese Patent Application 2012-170032, filed on Jul. 31, 2012, the entire content of which is incorporated herein by reference.

TECHNICAL FIELD

This disclosure generally relates to an intake manifold.

BACKGROUND DISCUSSION

A known intake manifold is disclosed in JP2010-65575A (hereinafter referred to as Patent reference 1). The known intake manifold, for example, disclosed in Patent reference 1 is provided with plural intake pipes corresponding to each air cylinder in an internal combustion engine and a blow-by gas distribution part connected to the intake pipes. At least one of inlet paths communicating the blow-by gas distribution part with intake pipes is positioned at a bottom portion of the blow-by gas distribution part while at least one of the inlet paths is positioned at an upper portion than the bottom portion of the blow-by gas distribution part (see, for example, Patent reference 1).

A known intake manifold, for example, disclosed in JP2010-84640A (hereinafter referred to as Patent reference 2) is provided with plural intake pipes corresponding to each air cylinder in an internal combustion engine and a blow-by gas distribution part connected to the intake pipes. The known intake manifold includes inlet paths communicating the blow-by gas distribution part with intake pipes and a lower surface of the inlet paths declines from the blow-by gas distribution part to the intake pipes while a lowermost end surface of the blow-by gas distribution part is positioned higher than a lowermost end surface of the inlet paths (see, for example, Patent reference 2)

According to the intake manifold disclosed in Reference 1, an inflow of liquid including water and oil generated from blow-by gas from the inlet paths positioned at the bottom portion of the blow-by gas distribution part to a part of the intake pipes may cause engine misfire and torque fluctuation in which output torque in each air cylinder of an engine differs from one another.

According to the intake manifold disclosed in Reference 2, an inflow of liquid including water and oil generated from blow-by gas from the inlet paths positioned at the blow-by gas distribution part to a part of the intake pipes may cause engine misfire and torque fluctuation.

A need thus exists for an intake manifold which is not susceptible to the drawback mentioned above.

SUMMARY

According to an aspect of this disclosure, an intake manifold includes plural intake pipes, a distribution portion connecting to the plural intake pipes and guiding fluid at an inside of the distribution portion to the plural intake pipes. The intake manifold further includes a first protruding portion provided at least a same number of the plural intake pipes at an inside of the distribution portion and is directed to the corresponding intake pipes.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A structure of an embodiment disclosed here will be described as follows.

An intake manifold 1 according to the embodiment of this disclosure will be described with reference to FIGS. 1 to 5.

Figure 1:
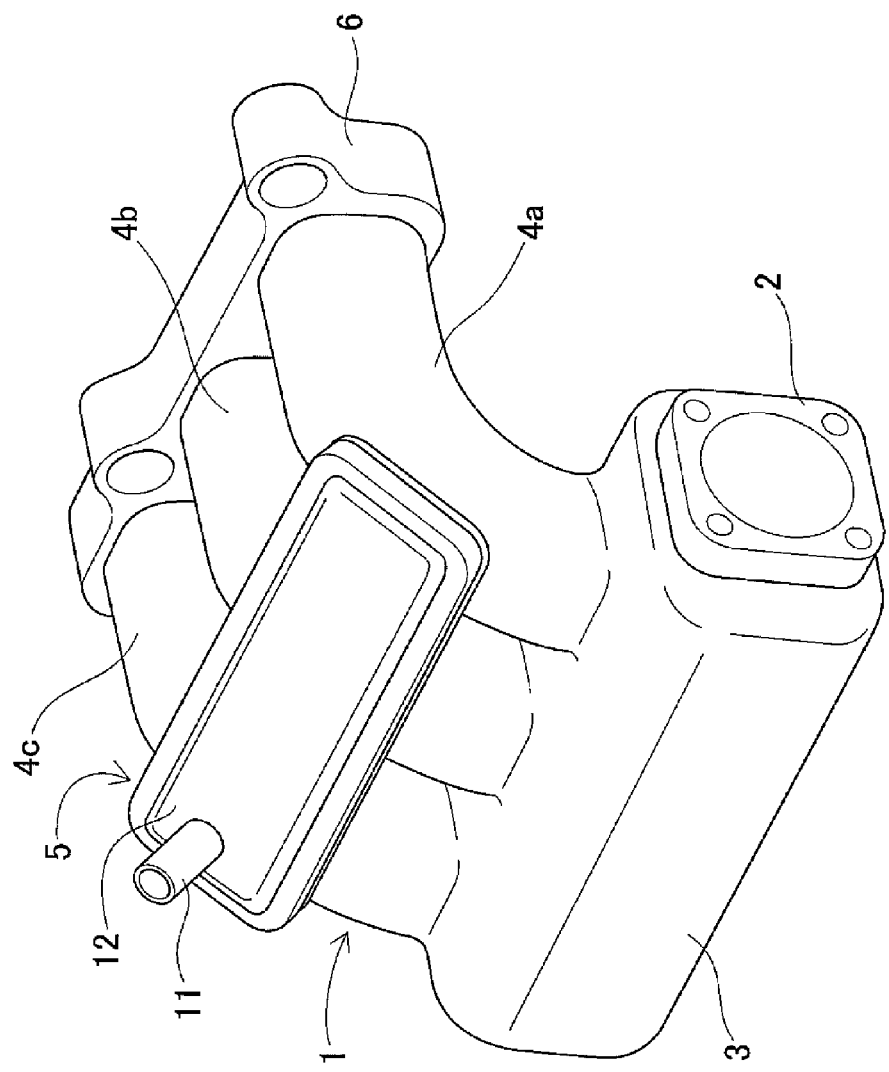
FIG. 1 is a perspective view of an intake manifold according to an embodiment disclosed here.

According to FIG. 1, the intake manifold 1 includes a first flange 2, a surge tank 3, a first intake pipe 4a, a second intake pipe 4b, a third intake pipe 4c, an EGR distribution portion 5 (serving as a distribution portion), and a second flange 6. The first flange 2 is connected to an intake flow channel while the surge tank 3 is connected to the first flange 2 and temporarily stores air flowing in. The first intake pipe 4a, the second intake pipe 4b and the third intake pipe 4c are connected to the surge tank 3 while the EGR distribution portion 5 is contacted to an outer circumferential surface of a curved portion of the first intake pipe 4a, the second intake pipe 4b and the third intake pipe 4c to introduce EGR gas to the first intake pipe 4a, the second intake pipe 4b and the third intake pipe 4c. The second flange 6 connects the first intake pipe 4a, the second intake pipe 4b and the third intake pipe 4c to an engine.

Figure 2:
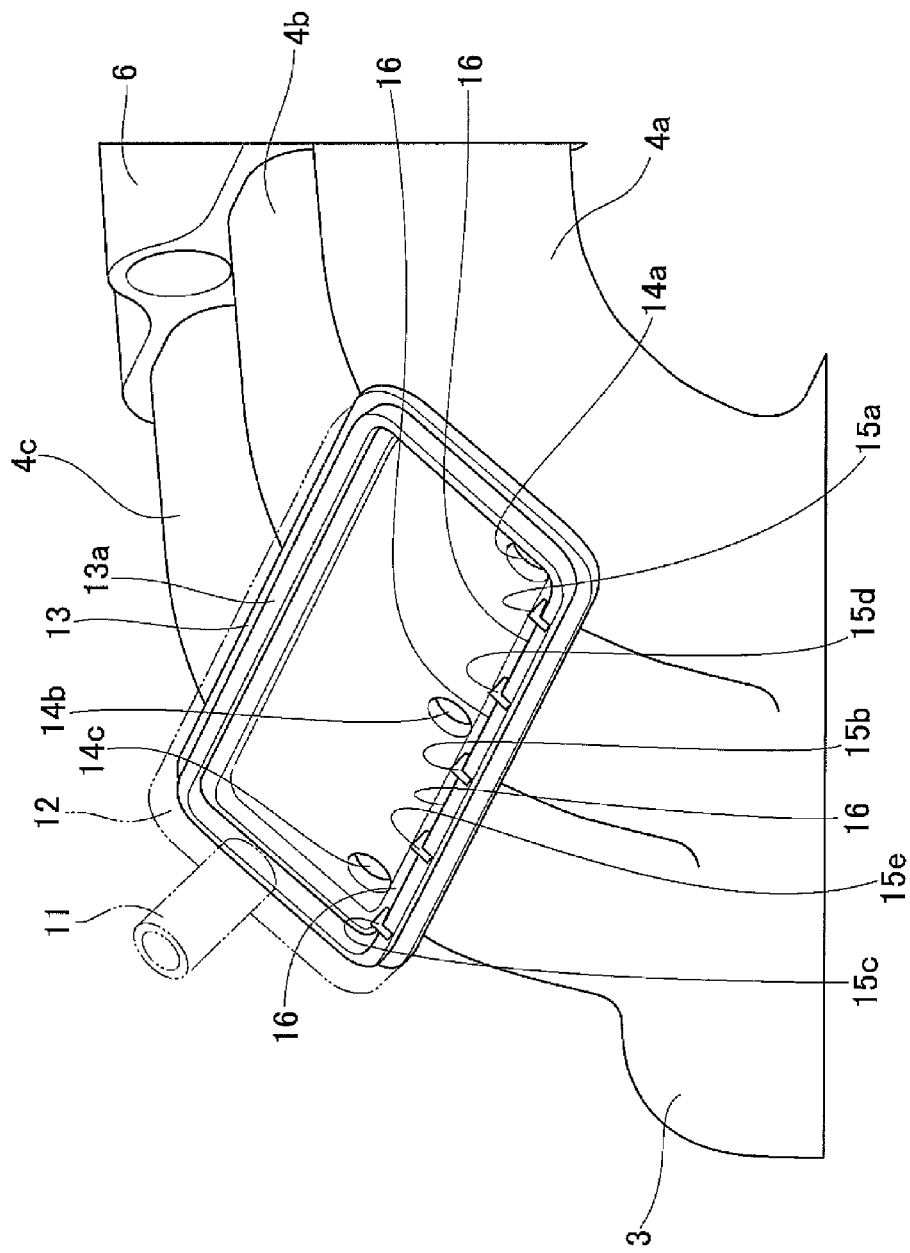
FIG. 2 is a partial enlarged view of the intake manifold according to the embodiment.
Figure 3:
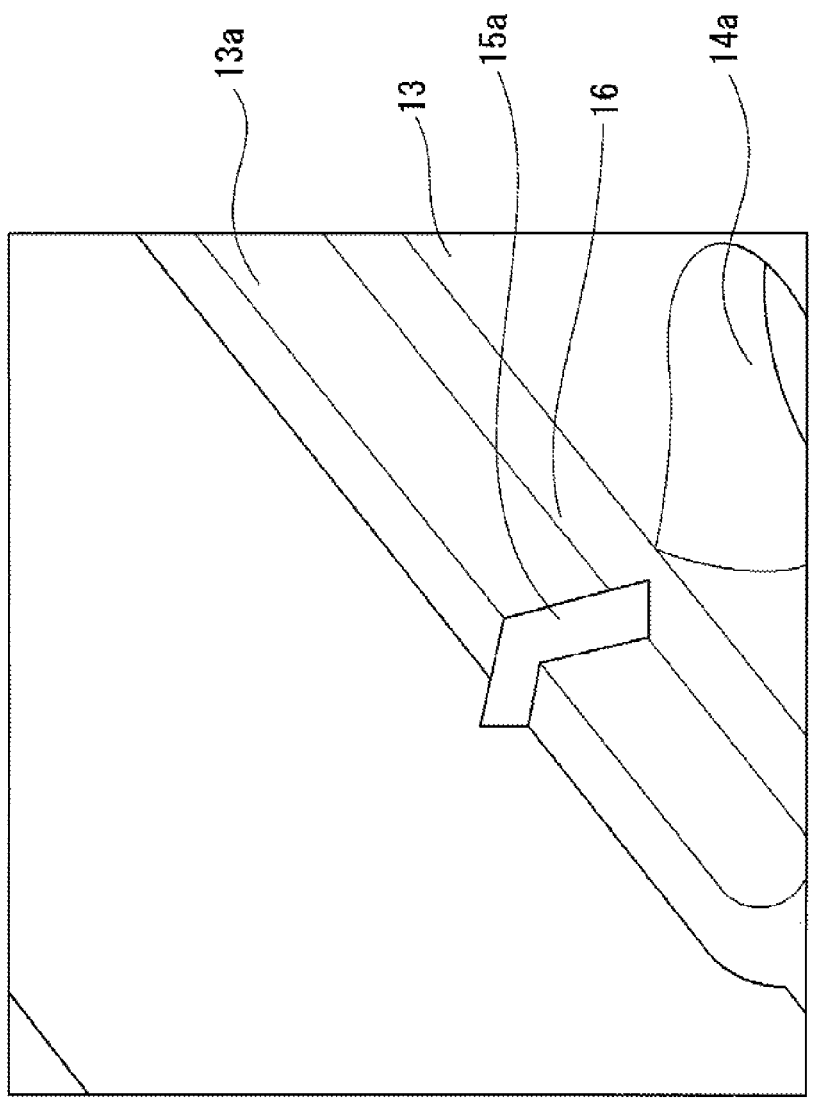
FIG. 3 is a partial enlarged view of an EGR distribution portion according to the embodiment.

According to FIGS. 2 and 3, the EGR distribution portion 5 includes a communication pipe 11 which supplies EGR gas from an exhaust manifold, a housing 12 connected to the communication pipe 11, and a receiving pan 13 welded to the housing 12 and connected to the outer circumferential surface of the curved portion (a front side of the intake pipes) of the first intake pipe 4a, the second intake pipe 4b and the third intake pipe 4c. The EGR distribution portion 5 is formed by welding a housing welding portion 12a (see FIG. 4) to a receiving pan welding portion 13a.

The receiving pan 13 includes a first inlet path 14a, a second inlet path 14b and a third inlet path 14c. The receiving pan 13 further includes a first dam portion 15a (serving as a first protruding portion), a second dam portion 15b (serving as a first protruding portion), a third dam portion 15c (serving as a first protruding portion), a fourth dam portion 15d (serving as a second protruding portion) and a fifth dam portion 15e (serving as a second protruding portion). The first inlet path 14a, the second inlet path 14b and the third inlet path 14c communicate with the first intake pipe 4a, the second intake pipe 4b and the third intake pipe 4c, respectively. The first dam portion 15a, the second dam portion 15b and the third dam portion 15c are directed to the first inlet path 14a, the second inlet path 14b and the third inlet path 14c, respectively. The fourth dam portion 15d is provided between the first dam portion 15a and the second dam portion 15b, and the fifth dam portion 15e is provided between the second dam portion 15b and the third dam portion 15c.

In other words, the first dam portion 15a extends toward a center of the first inlet path 14a, the second dam portion 15b extends toward a center of the second inlet path 14b and the third dam portion 15c extends toward a center of the third inlet path 14c. The first dam portion 15a, the second dam portion 15b and the third dam portion 15c have a shape to guide fluid to the first inlet path 14a, the second inlet path 14b and the third inlet path 14c. Further, between the first dam portion 15a and the fourth dam portion 15d, between the fourth dam portion 15d and the second dam portion 15b, between the second dam portion 15b and the fifth dam portion 15e, and between the fifth dam portion 15e and the third dam portion 15c are equally spaced from each other.

The first dam portion 15a, the second dam portion 15b, the third dam portion 15c, the fourth dam portion 15d and the fifth dam portion 15e extend from the receiving pan welding portion 13a positioned at a lowermost end in a gravity direction (close to the surge tank 3) within an inner surface of the receiving pan 13, toward a direction of the first inlet path 14a, the second inlet path 14b and the third inlet path 14c and toward a longitudinal direction (a flowing direction of fluid) of the first intake pipe 4a, the second intake pipe 4b and the third intake pipe 4c. The first dam portion 15a, the second dam portion 15b, the third dam portion 15c, the fourth dam portion 15d and the fifth dam portion 15e extend from the receiving pan welding portion 13a positioned at the lowermost end in the gravity direction (close to the surge tank 3) within the inner surface of the receiving pan 13, toward a direction to the housing 12 to which the first dam portion 15a, the second dam portion 15b, the third dam portion 15c, the fourth dam portion 15d and the fifth dam portion 15e are welded. The first dam portion 15a, the second dam portion 15b, the third dam portion 15c, the fourth dam portion 15d and the fifth dam portion 15e have a tapered shape toward an extending direction.

Figure 4:
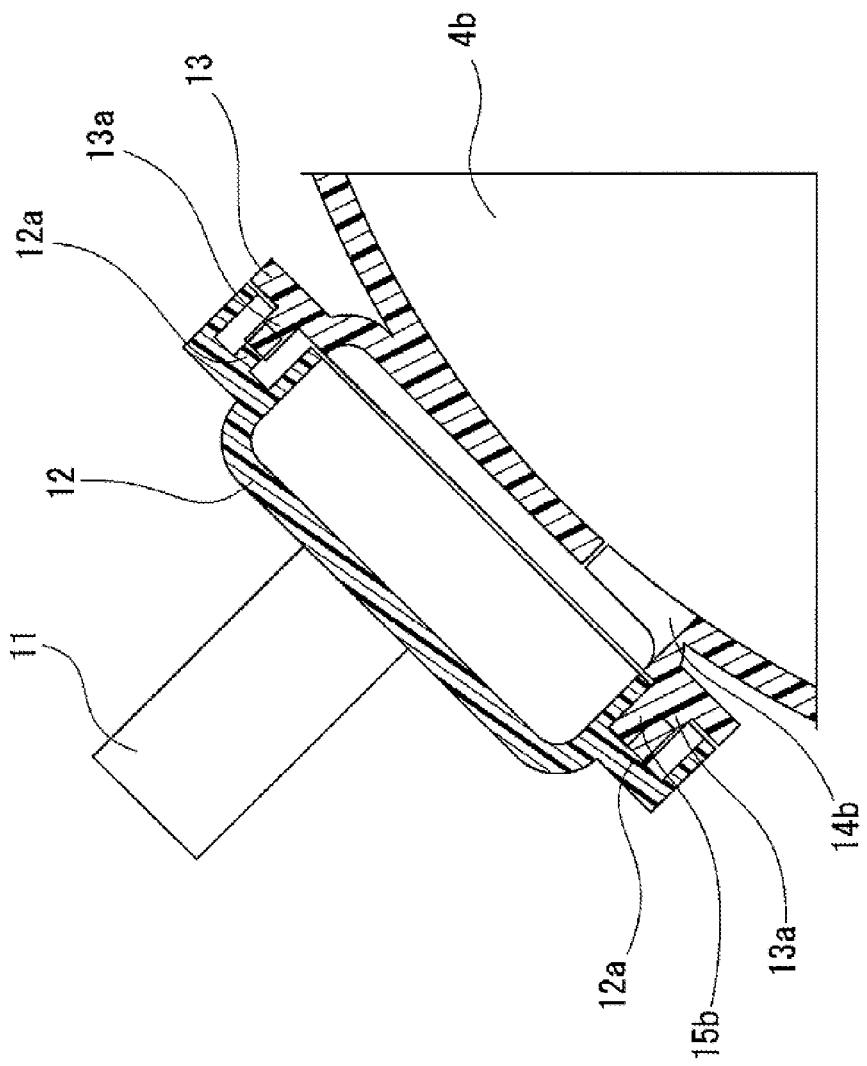
FIG. 4 is a partial cross-sectional view of a portion of the intake manifold with a dam portion according to the embodiment.
Figure 5:
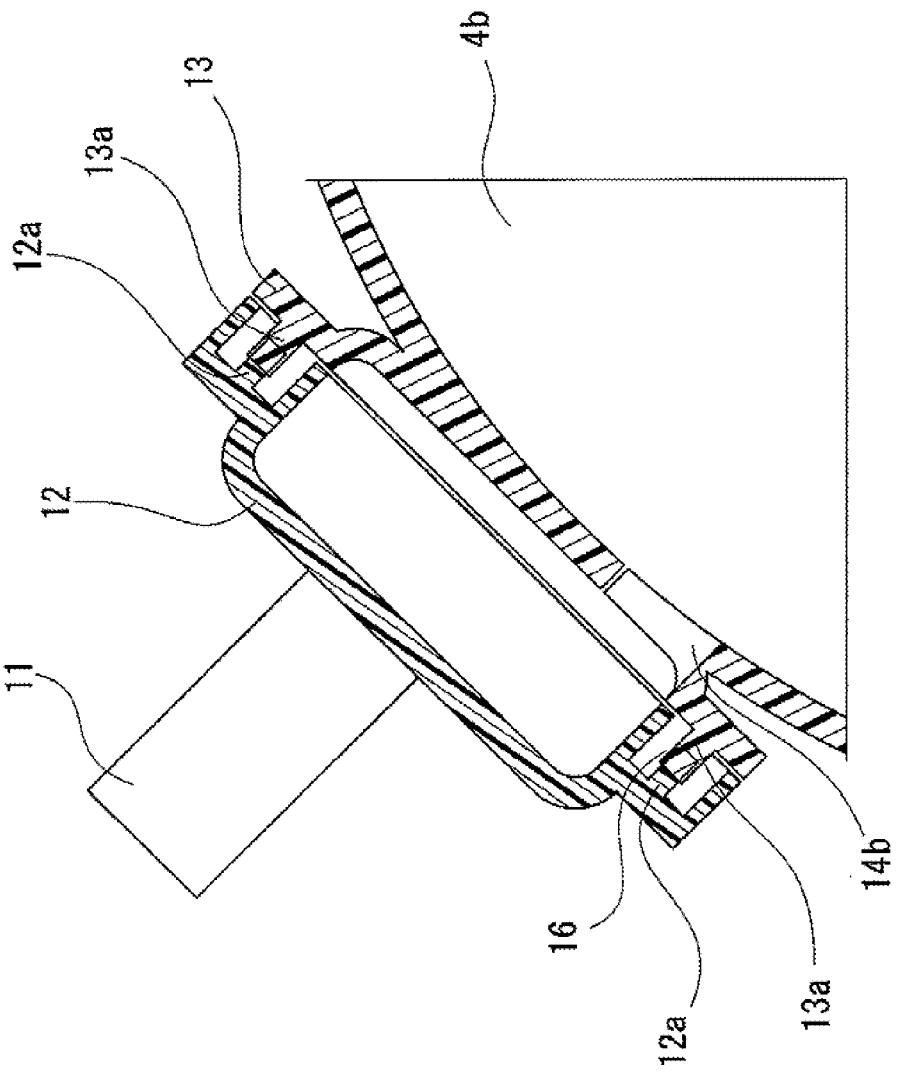
FIG. 5 is a partial cross-sectional view of a portion of the intake manifold where the dam portion is not arranged according to the embodiment.

FIG. 4 is a partial cross-sectional view of a portion of the intake manifold 1 with the second dam portion 15b, in which the housing 12 and the second dam portion 15b are welded so that the housing welding portion 12a and the second dam portion 15b closely contact each other. While the second dam portion 15b is given as an example, the first dam portion 15a, the third dam portion 15c, the fourth dam portion 15d and the fifth dam portion 15e are formed in a similar manner. FIG. 5 is a partial cross-sectional view of a portion of the intake manifold 1 where the dam portion is not arranged, in which only the housing welding portion 12a and the receiving pan welding portion 13a are welded to form a void 16.

A part in which the first dam portion 15a, the second dam portion 15b, the third dam portion 15c, the fourth dam portion 15d and the fifth dam portion 15e are not included and only the housing welding portion 12a and the receiving pan welding portion 13a are welded forms a void, and voids formed between the first dam portion 15a and the fourth dam portion 15d, between the fourth dam portion 15d and the second dam portion 15b, between the second dam portion 15b and the fifth dam portion 15e, and between the fifth dam portion 15e and the third dam portion 15c are defined as the voids 16. The voids 16 are positioned at the lowermost end in the gravity direction within an inside of the EGR distribution portion 5 which the housing 12 and the receiving pan 13 are welded.

An operation of the embodiment disclosed will be described.

Air flowing in from the intake flow channel is temporarily stored in the surge tank 3 and air stored is distributed uniformly to the first intake pipe 4a, the second intake pipe 4b and the third intake pipe 4c to send air to the engine.

The EGR gas is sent to the EGR distribution portion 5 from the exhaust manifold via the communication pipe 11. The EGR gas is formed of gas and partly turned into liquid including water and oil by being cooled. Gas and liquid is sent to the EGR distribution portion 5 in a mixed state. Further, the EGR gas is partly turned into liquid including water and oil by being cooled inside the EGR distribution portion 5.

Gaseous components in the EGR gas are distributed uniformly from the first inlet path 14a, the second inlet path 14b and the third inlet path 14c to the first intake pipe 4a, the second intake pipe 4b and the third intake pipe 4c and the gaseous components mixed with air is sent to the engine.

Liquid in the EGR gas runs down an inner surface of the EGR distribution portion 5 to a lower portion in the gravity direction. Liquid run down is gathered at the voids 16 formed when the housing welding portion 12a and the receiving pan welding portion 13a are welded. Liquid gathered at the voids 16 move in a direction in which force is applied by vibration of the engine, acceleration and deceleration or a gravity at a time of rotation of a vehicle. However, because the first dam portion 15a, the second dam portion 15b, the third dam portion 15c, the fourth dam portion 15d and the fifth dam portion 15e exist, liquid gathered at the voids 16 needs to get over these dam portions to move, resulting that liquid is distributed to the voids 16 between dam portions, respectively, and gathered therein.

Liquid distributed and gathered at the voids 16 is distributed uniformly from the first inlet path 14a, the second inlet path 14b and the third inlet path 14c to the first intake pipe 4a, the second intake pipe 4b and the third intake pipe 4c, respectively, after flowing over the dam portions and is sent to the engine after being mixed with the EGR gas which is air and gas.

Next, effects and advantages of the embodiment of the disclosure will be described.

Because of a construction of the first dam portion 15a, the second dam portion 15b and the third dam portion 15c are provided, the intake manifold 1 refrains liquid including water and oil generated from the EGR gas from flowing into a single intake pipe disproportionately and allows to distribute liquid to plural intake pipes.

Because the first dam portion 15a, the second dam portion 15b and the third dam portion 15c extend to the longitudinal direction (the flowing direction of fluid) of the first intake pipe 4a, the second intake pipe 4b and the third intake pipe 4c, respectively, the intake manifold 1 guides liquid including water and oil generated from the EGR gas to the first intake pipe 4a, the second intake pipe 4b and the third intake pipe 4c while further refrains liquid including water and oil generated from the EGR gas from flowing into a single intake pipe (for example, either the first intake pipe 4a or the third intake pipe 4c which is positioned at an end of the first intake pipe 4a, the second intake pipe 4b and the third intake pipe 4c) disproportionately and distributes uniformly to the first intake pipe 4a, the second intake pipe 4b and the third intake pipe 4c.

In addition, because of a construction of the first inlet path 14a, the second inlet path 14b and the third inlet path 14c are provided, and the first dam portion 15a, the second dam portion 15b and the third dam portion 15c extend to the first inlet path 14a, the second inlet path 14b and the third inlet path 14c, the intake manifold 1 guides liquid including water and oil generated from the EGR gas to the first inlet path 14a, the second inlet path 14b and the third inlet path 14c, further refrains water and gas generated from the EGR gas from flowing into a single intake pipe (for example, either the first intake pipe 4a or the third intake pipe 4c which is positioned at an end of the first intake pipe 4a, the second intake pipe 4b and the third intake pipe 4c) disproportionately and distributes uniformly to the first intake pipe 4a, the second intake pipe 4b and the third intake pipe 4c.

The intake manifold 1 refrains liquid including water and oil generated from the EGR gas gathered at the voids 16, the lowermost end in the gravity direction within the inner surface of the EGR distribution portion 5 from flowing into a single intake pipe (for example, either the first intake pipe 4a or the third intake pipe 4c which is positioned at an end of the first intake pipe 4a, the second intake pipe 4b and the third intake pipe 4c) disproportionately and distributes uniformly to the first intake pipe 4a, the second intake pipe 4b and the third intake pipe 4c.

Further, because the fourth dam portion 15d is provided between the first dam portion 15a and the second dam portion 15b, and the fifth dam portion 15e is provided between the second dam portion 15b and the third dam portion 15c, the voids 16 may be divided smaller. The intake manifold 1 further refrains, by the fourth dam portion 15d and the fifth dam portion 15e, liquid including water and oil generated from the EGR gas from flowing into a single intake pipe (for example, either the first intake pipe 4a or the third intake pipe 4c which is positioned at an end of the first intake pipe 4a, the second intake pipe 4b and the third intake pipe 4c) disproportionately and distributes uniformly to the first intake pipe 4a, the second intake pipe 4b and the third intake pipe 4c.

As the first dam portion 15a, the second dam portion 15b, the third dam portion 15c, the fourth dam portion 15d and the fifth dam portion 15e have a tapered shape toward an extending direction, the first dam portion 15a, the second dam portion 15b, the third dam portion 15c, the fourth dam portion 15d and the fifth dam portion 15e refrain resistance of welding or product failure by having welding burrs when first dam portion 15a, the second dam portion 15b, the third dam portion 15c, the fourth dam portion 15d and the fifth dam portion 15e are welded.

Because between the first dam portion 15a and the fourth dam portion 15d, between the fourth dam portion 15d and the second dam portion 15b, between the second dam portion 15b and the fifth dam portion 15e, and between the fifth dam portion 15e and the third dam portion 15c are equally spaced from each other, the intake manifold 1 distributes liquid including water and oil uniformly to the voids 16 between the first dam portion 15a and the fourth dam portion 15d, between the fourth dam portion 15d and the second dam portion 15b, between the second dam portion 15b and the fifth dam portion 15e, and between the fifth dam portion 15e and the third dam portion 15c. The intake manifold 1 further refrains liquid including water and oil from flowing into a single intake pipe disproportionately, and distributes liquid including water and oil further uniformly to the plural intake pipes.

The number of air cylinders and intake pipes of the engine are same. As this embodiment describes a three-cylinder engine, the number of intake pipes is three.

While the EGR distribution portion 5 is positioned at the outer circumferential surface of the curved portion of the first intake pipe 4a, the second intake pipe 4b, and the third intake pipe 4c in this embodiment, alternatively, the EGR distribution portion 5 may be positioned at an inner circumferential surface of a curved portion (a back side of the intake pipes) of the first intake pipe 4a, the second intake pipe 4b and the third intake pipe 4c.

While the EGR distribution portion 5 includes the housing 12 welded to the receiving pan 13 in this embodiment, the housing 12 and the receiving pan 13 may be fixed with bolts by intervening an adhesion member or a gasket.

While the EGR distribution portion 5 is given as an example to distribute EGR gas, a blow-by gas distribution portion distributing blow-by gas to each intake pipe in a similar structure may be applied as a distribution portion.

Figure 6:
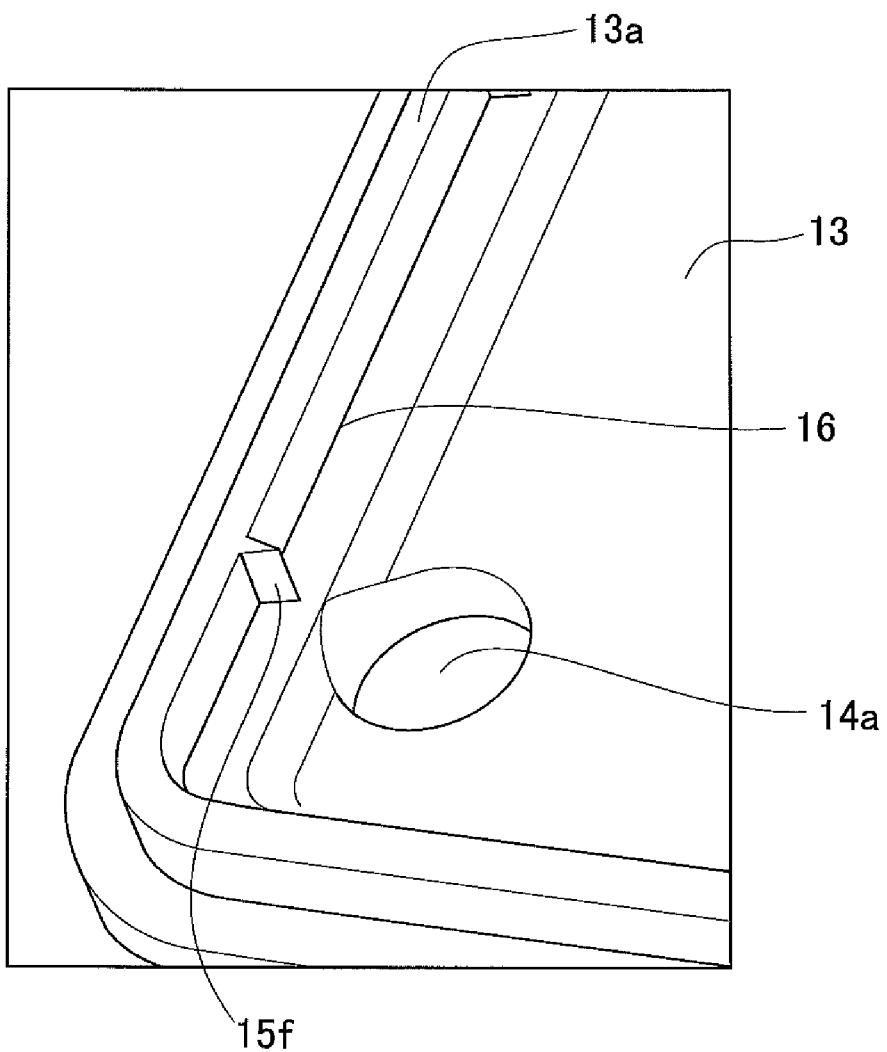
FIG. 6 is a partial enlarged view of the EGR distribution portion according to a first modified example of the disclosure.

A structure of a first modified example of the disclosure will be described as follows. FIG. 6 is a partial enlarged view of the EGR distribution portion 5 according to the first modified example of the disclosure. A difference to the embodiment illustrated in FIG. 3 is, while the first dam portion 15a extends from the receiving pan welding portion 13a toward a direction to the housing 12 in the embodiment, a first dam portion 15f in the first modified example has a same height as that of the receiving pan welding portion 13a. A second dam portion, a third dam portion, a fourth dam portion and a fifth dam portion in the first modified example have a same shape.

Effects and advantages of the first modified example of the disclosure will be described. As the first dam portion, the second dam portion, the third dam portion, the fourth dam portion and the fifth dam portion do not extend toward the direction to the housing 12 in the first modified example, resistance of welding or product failure by having welding burrs may be further refrained.

Figure 7:
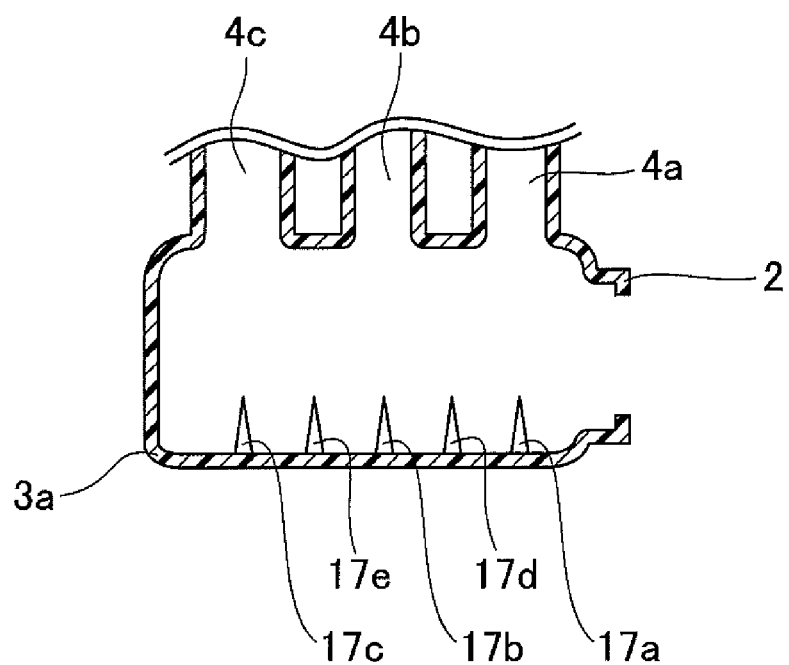
FIG. 7 is a partial cross-sectional view of a surge tank according to a second modified example of the disclosure.

A structure of a second modified example of the disclosure will be described as follows. FIG. 7 is a partial cross-sectional view of a surge tank 3a according to the second modified example of the disclosure.

The surge tank 3a in the second modified example includes a first dam portion 17a (serving as a first protruding portion), a second dam portion 17b (serving as a first protruding portion) and a third dam portion 17c (serving as a first protruding portion) that communicate with the first intake pipe 4a, the second intake pipe 4b and the third intake pipe 4c, respectively, and are directed to the first intake pipe 4a, the second intake pipe 4b and the third intake pipe 4c, respectively. The surge tank 3a further includes a fourth dam portion 17d (serving as a second protruding portion) between the first dam portion 17a and the second dam portion 17b, and a fifth dam portion 17e (serving as a second protruding portion) between the second dam portion 17b and the third dam portion 17c.

The first dam portion 17a, the second dam portion 17b, the third dam portion 17c, the fourth dam portion 17d and the fifth dam portion 17e extend from the lowermost end in the gravity direction within the inner surface of the surge tank 3a toward the first intake pipe 4a, the second intake pipe 4b, and the third intake pipe 4c, respectively. The first dam portion 17a, the second dam portion 17b, the third dam portion 17c, the fourth dam portion 17d and the fifth dam portion 17e have a tapered shape toward an extending direction.

Effects and advantages of the second modified example in this embodiment will be described. According to the second modified example, because of a construction of the first dam portion 17a, the second dam portion 17b, the third dam portion 17c, the fourth dam portion 17d and the fifth dam portion 17e are provided, the intake manifold 1 guides liquid including water and oil generated from air flowing in from the intake flow channel to the first intake pipe 4a, the second intake pipe 4b and the third intake pipe 4c, refrains liquid including water and oil generated from air flowing from the intake channel from flowing into a single intake pipe disproportionately and distributes uniformly to the first intake pipe 4a, the second intake pipe 4b and the third intake pipe 4c.

According to the above aforementioned embodiment, the intake manifold 1 includes the plural intake pipes, the EGR distribution portion 5 connecting to the plural intake pipes and guiding fluid at the inside of the EGR distribution portion 5 to the plural intake pipes. The intake manifold 1 further includes the first dam portion 15a, the second dam portion 15b and the third dam portion 15c which are provided at least the same number of the plural intake pipes at the inside of the EGR distribution portion 5 and are directed to the corresponding intake pipes.

According to the above described structure, because of the construction in which the first dam portion 15a, the second dam portion 15b and the third dam portion 15c are provided, the intake manifold 1 refrains liquid including water and oil generated from fluid from flowing into a single intake pipe disproportionately and distributes uniformly to the plural intake pipes.

According to another aforementioned embodiment, the first dam portion 15a, the second dam portion 15b and the third dam portion 15c extend toward the longitudinal direction of the first intake pipe 4a, the second intake pipe 4b and the third intake pipe 4c.

According to the above described structure, because the first dam portion 15a, the second dam portion 15b and the third dam portion 15c extend toward the longitudinal direction of the first intake pipe 4a, the second intake pipe 4b and the third intake pipe 4c, the intake manifold 1 guides water and oil generated from fluid to the first intake pipe 4a, the second intake pipe 4b and the third intake pipe 4c, respectively, further refrains water and oil generated from fluid from flowing into a single intake pipe disproportionately and distributes uniformly to the plural intake pipes.

According to another aforementioned embodiment, the intake manifold 1 further includes the surge tank 3 guiding air from an outside of the EGR distribution portion 5 to the plural intake pipes. Provided independently of the surge tank 3, the EGR distribution portion 5 corresponds to an expansion chamber guiding fluid, which is different from air, flowing into the inside of the EGR distribution portion 5 to the plural intake pipes and the first dam portion 15a, the second dam portion 15b and the third dam portion 15c are provided in the expansion chamber.

According to the above described structure, because of the construction in which the first dam portion 15a, the second dam portion 15b and the third dam portion 15c are provided, the intake manifold 1 refrains liquid including water and oil generated from fluid, for example, the EGR gas and the blow-by gas circulating in the intake mechanism from flowing into a single intake pipe disproportionately and distributes liquid including water and oil uniformly to the plural intake pipes.

According to another aforementioned embodiment, the intake manifold 1 further includes the first inlet path 14a, the second inlet path 14b and the third inlet path 14c which are provided at the expansion chamber and communicate with the plural intake pipes. The first dam portion 15a, the second dam portion 15b and the third dam portion 15c extend toward the first inlet path 14a, the second inlet path 14b and the third inlet path 14c.

According to the above described structure, because of the construction in which the first inlet path 14a, the second inlet path 14b and the third inlet path 14c are provided and the first dam portion 15a, the second dam portion 15b and the third dam portion 15c extend toward the first inlet path 14a, the second inlet path 14b and the third inlet path 14c, the intake manifold 1 guides liquid including water and oil generated from fluid, for example, the EGR gas and the blow-by gas circulating in the intake mechanism to the first inlet path 14a, the second inlet path 14b and the third inlet path 14c respectively. The intake manifold 1 further refrains liquid including water and oil generated from fluid, for example, the EGR gas and the blow-by gas circulating in the intake mechanism from flowing into a single intake pipe disproportionately and distributes liquid including water and oil uniformly to the plural intake pipes.

According to another aforementioned embodiment, the EGR distribution portion 5 corresponds to the surge tank 3 guiding fluid which is air from the outside of the EGR distribution portion 5 to the plural intake pipes and the first dam portion 15a, the second dam portion 15b and the third dam portion 15c are provided in the surge tank 3.

According to the above described structure, because of the construction in which the first dam portion 15a, the second dam portion 15b and the third dam portion 15c are provided, the intake manifold 1 guides water and oil generated from air from the outside of the EGR distribution portion 5 to the first inlet path 14a, the second inlet path 14b and the third inlet path 14c, respectively. The intake manifold 1 refrains water and oil generated from fluid from flowing into a single intake pipe disproportionately and distributes uniformly to the plural intake pipes.

According to another aforementioned embodiment, the first dam portion 15a, the second dam portion 15b and the third dam portion 15c extend from the lowermost end portion in the gravity direction within the inner surface of the EGR distribution portion 5.

According to the above described structure, the intake manifold 1 refrains the liquid including water and oil gathered at the lowermost end in the gravity direction within the inner surface of the EGR distribution portion 5 from flowing into the single intake pipe disproportionately and distributes uniformly to the plural intake pipes.

According to another aforementioned embodiment, the intake manifold 1 further includes the second protruding portion (the fourth dam portion 15d and the fifth dam portion 15e) which are provided between the first protruding portions (the first dam portion 15a, the second dam portion 15b and the third dam portion 15c) which are arranged adjacent to each other.

According to the above described structure, because of the construction in which the second protruding portion (the fourth dam portion 15d and the fifth dam portion 15e) in addition to the first protruding portion (the first dam portion 15a, the second dam portion 15b and the third dam portion 15c) are provided, the intake manifold 1 divides the voids 16 smaller at the lowermost end in the gravity direction within the inside of the EGR distribution portion 5. The intake manifold 1 further refrains liquid including water and oil generated from fluid from flowing into a single intake pipe disproportionately and distributes uniformly to the plural intake pipes.

According to another aforementioned embodiment, the first dam portion 15a, the second dam portion 15b and the third dam portion 15c have the tapered shape from upper to lower of the flowing channel direction of fluid.

According to the above described structure, the first dam portion 15a, the second dam portion 15b and the third dam portion 15c refrain from being resistance of welding or product failure by having welding burrs at a time of welding of the dam portions.

According to another aforementioned embodiment, the first protruding portions (the first dam portion 15a, the second dam portion 15b and the third dam portion 15c) and the second protruding portion (the fourth dam portion 15d and the fifth dam portion 15e) arranged adjacent to each other are equally spaced from each other.

According to the above described structure, because the first protruding portions (the first dam portion 15a, the second dam portion 15b and the third dam portion 15c) and the second protruding portion (the fourth dam portion 15d and the fifth dam portion 15e) arranged adjacent to each other are equally spaced from each other, the intake manifold 1 distributes liquid including water and oil uniformly to the voids 16 between the first protruding portions (the first dam portion 15a, the second dam portion 15b and the third dam portion 15c) and the second protruding portion (the fourth dam portion 15d and the fifth dam portion 15e) which are arranged adjacent to each other. The intake manifold 1 further refrains liquid including water and oil from flowing into the single intake pipe and distributes further uniformly to the plural intake pipes.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An intake manifold, comprising:
   a plurality of intake pipes bringing in outside air;
   a distribution portion connecting to the plurality of the intake pipes and guiding EGR gas or blow-by gas from inside of the distribution portion to the plurality of the intake pipes;
   a first protruding portion provided at least a same number of the plurality of the intake pipes at the inside of the distribution portion;
   a surge tank guiding air from outside the distribution portion to the plurality of the intake pipes, wherein the distribution portion is provided independently of the surge tank and the distribution portion corresponds to an expansion chamber guiding the EGR gas or the blow-by gas, which is different from air, flowing into the inside of the distribution portion to the plurality of the intake pipes, and the first protruding portion is provided in the expansion chamber; and
   an inlet path provided at the expansion chamber, communicating with the plurality of the intake pipes, and guiding the EGR gas or the blow-by gas to the plurality of the intake pipes, wherein the first protruding portion has an end closest to the inlet path possessing an axis that passes through the inlet path.

2. The intake manifold according to claim 1, wherein the first protruding portion extends toward a longitudinal direction of the intake pipe.

3. The intake manifold according to claim 1, wherein the first protruding portion extends from a lowermost end portion in a gravity direction within an inner surface of the distribution portion.

4. The intake manifold according to claim 1, further comprising:
   a second protruding portion provided between the first protruding portions which are arranged adjacent to each other.

5. The intake manifold according to claim 1, wherein the first protruding portion has a tapered shape from upper to lower of a flowing channel direction of the fluid.

6. The intake manifold according to claim 4, wherein the first protruding portions and the second protruding portion arranged adjacent to each other are equally spaced from each other.

7. The intake manifold according to claim 1, wherein the distribution portion comprises a communication pipe supplying fluid from outside the distribution portion, a housing connected to the communication pipe, and a receiving pan connected to the plurality of intake pipes, the housing being welded to the plurality of intake pipes.

8. The intake manifold according to claim 7, wherein the first protruding portion is provided at a portion in which the housing is welded to the receiving pan.

* * * * *